United States Patent
Hogan et al.

(10) Patent No.: US 6,955,405 B1
(45) Date of Patent: Oct. 18, 2005

(54) INSERTS FOR VEHICLE WHEEL ASSEMBLIES

(75) Inventors: Scott A. Hogan, Sylvan Lake, MI (US); Jeff Bruce, Fowlerville, MI (US); Roger Renaud, Brighton, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 10/837,564

(22) Filed: Apr. 30, 2004

(51) Int. Cl.$^7$ ................................. B60B 7/00
(52) U.S. Cl. ................. 301/37.43; 301/37.11
(58) Field of Search ....... 301/37.101, 37.102, 301/37.32, 37.11, 37.43, 37.106

(56) References Cited

U.S. PATENT DOCUMENTS

| | | | |
|---|---|---|---|
| 3,669,501 A | | 6/1972 | Derleth |
| 4,007,967 A | * | 2/1977 | Buerger .................... 301/37.42 |
| 5,143,426 A | * | 9/1992 | Todd ....................... 301/37.43 |
| 5,340,201 A | * | 8/1994 | Weirs ...................... 301/37.26 |
| 5,368,370 A | | 11/1994 | Beam |
| 5,393,128 A | | 2/1995 | Sarmast et al. |
| 5,458,401 A | | 10/1995 | Baccman et al. |
| 5,595,423 A | | 1/1997 | Heck et al. |
| 5,597,213 A | | 1/1997 | Chase |
| RE35,497 E | * | 4/1997 | Carter, III ................ 301/37.43 |
| 5,630,654 A | * | 5/1997 | Chase ..................... 301/37.43 |
| 5,664,845 A | | 9/1997 | Maloney et al. |
| 5,795,035 A | * | 8/1998 | Fuller ..................... 301/37.32 |
| 5,820,225 A | | 10/1998 | Ferriss et al. |
| 5,845,973 A | | 12/1998 | Chase |
| 6,007,158 A | | 12/1999 | Maloney et al. |
| 6,082,829 A | * | 7/2000 | Chase ..................... 301/37.43 |
| 6,106,075 A | | 8/2000 | Suenaga |
| 6,286,908 B1 | | 9/2001 | Maloney et al. |
| 6,386,642 B2 | | 5/2002 | Maloney et al. |
| 6,450,582 B2 | * | 9/2002 | Ichikawa et al. ........ 301/37.36 |
| 6,460,938 B1 | * | 10/2002 | Baumgarten ............. 301/37.11 |
| 6,637,832 B2 | * | 10/2003 | Wrase et al. ............. 301/37.31 |
| 6,663,189 B2 | * | 12/2003 | Enomoto et al. ........ 301/37.36 |
| 6,779,852 B2 | * | 8/2004 | Van Houten et al. .... 301/37.43 |
| 2002/0185908 A1 | | 12/2002 | Woelfel |
| 2003/0067212 A1 | * | 4/2003 | Wrase et al. ............. 301/37.43 |

* cited by examiner

*Primary Examiner*—Russell D. Stormer
(74) *Attorney, Agent, or Firm*—Butzel Long

(57) ABSTRACT

Inserts that are configured to be placed in gaps provide between wheel covers and underlying wheel of wheel assemblies. The inserts are made from materials that are suitable rigid and strong so as to reinforce and protect the overlying portions of the wheel cover from impact damage such as denting in the case of metal wheel covers and cracking or breaking in the case of plastic wheel covers. The inserts further prevent otherwise hollow portions of the wheel assembly from sounding, feeling or seeming hollow.

20 Claims, 3 Drawing Sheets

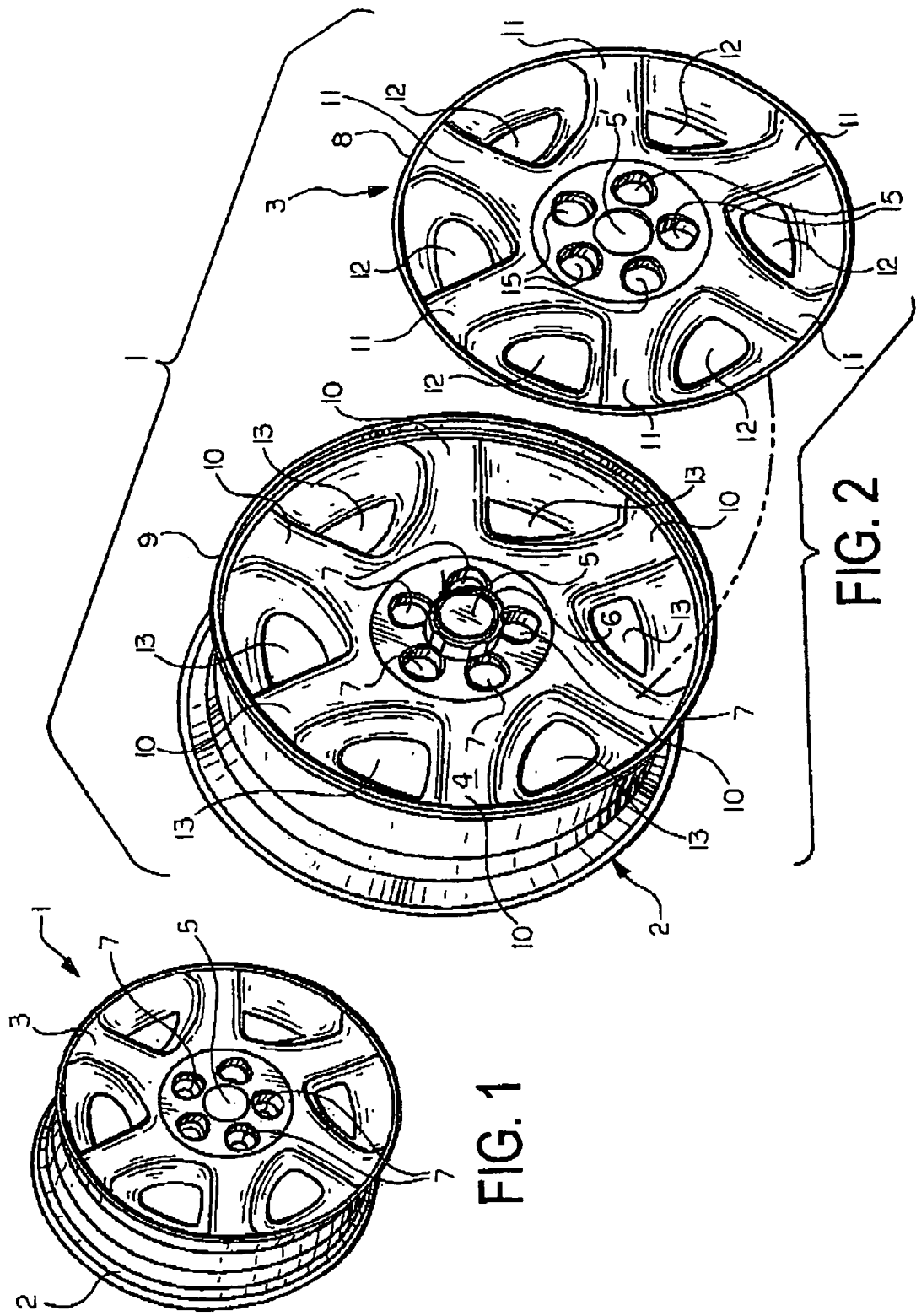

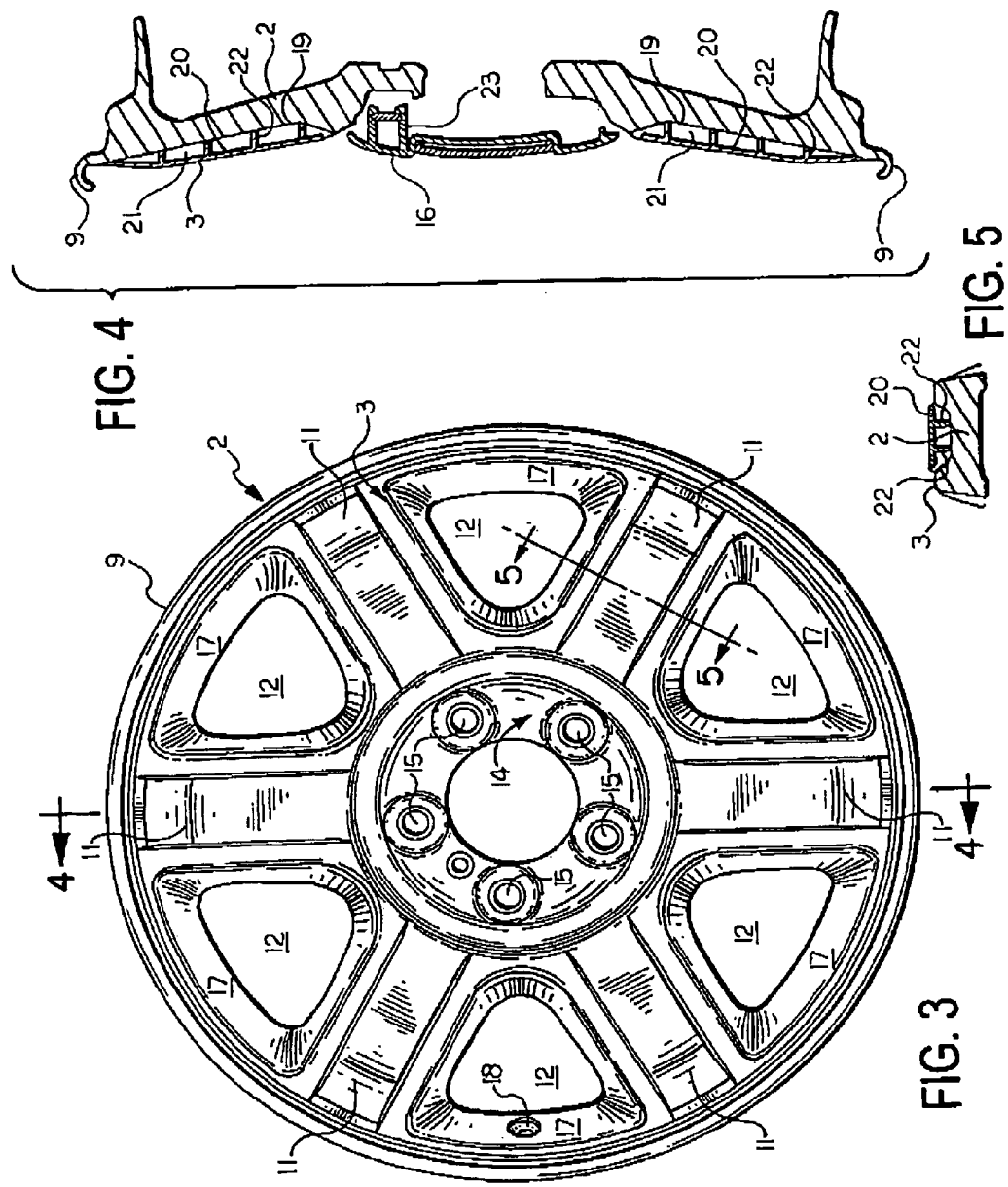

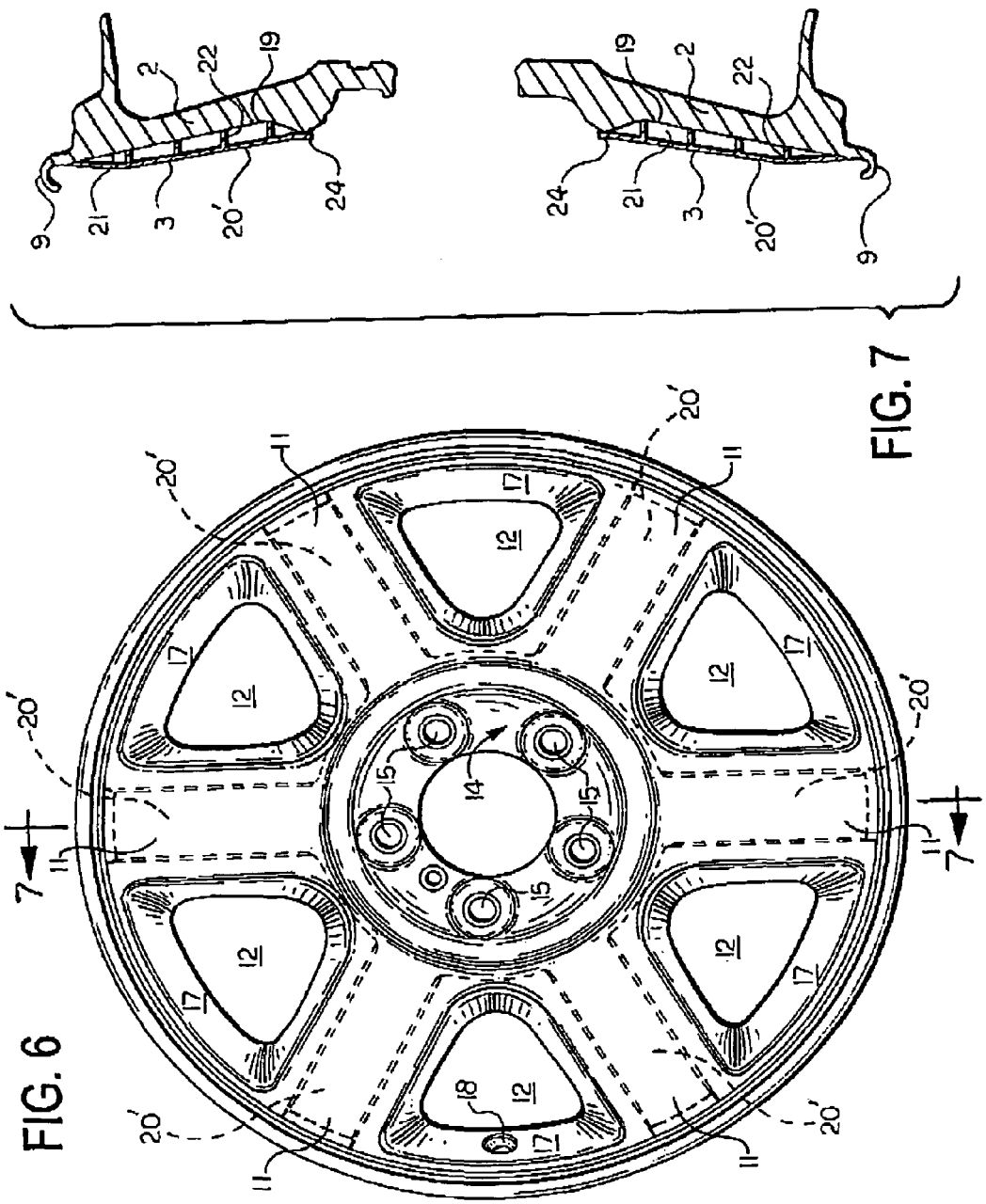

INSERTS FOR VEHICLE WHEEL ASSEMBLIES

TECHNICAL FIELD

The present invention relates to vehicle wheel assemblies which include decorative wheel covers that are secured over underlying wheels for aesthetic purposes. More specifically, the present invention relates to wheel assemblies that include inserts located between decorative wheel covers and underlying wheels which inserts reinforce the wheel covers so as to prevent damage to the decorative wheel cover and prevent the wheel assembly from seeming hollow.

BACKGROUND ART

Wheel assemblies that utilize wheel appliqués to decorate the external or outboard surfaces of plain steel wheels are well known and are far less expensive to produce than one-piece decorative wheels that have to be formed and finished.

Wheel appliqués can be secured to wheels by various mechanical engaging structures and/or by adhesives. U.S. Pat. No. 5,664,845 to Maloney et al. discloses a vehicle wheel cover retention system in which the annular lip of the wheel cover is configured to spring outwardly into a groove provided in the inner surface of the wheel. U.S. Pat. No. 5,595,423 to Heck et al. discloses a vehicle wheel cover retention system in which the outer end of the wheel cover is deformed to cover the outer peripheral end of the outboard bead seat retaining flange of the wheel. Both U.S. Pat. No. 5,664,845 to Maloney et al. and U.S. Pat. No. 5,595,423 to Heck et al. utilize an adhesive in cooperation with their respective mechanical engaging structures.

Many wheel assemblies include decorative wheel covers that are adhesively attached to underlying wheels. U.S. Pat. No. 3,669,501 to Derleth discloses the use of a foamable adhesive that is used to secure a decorative cover to a wheel. The decorative cover in Derleth is configured to have variations in contour in a direction transverse to the axis of the wheel which exceed the variations in the rim and/or disc contour of the wheel, which variations would be extremely difficult and expensive, if not impossible, to stamp or draw in the disc of the wheel. During assembly, a foamable adhesive is coated on the wheel, and the decorative cover is then quickly clamped to the wheel before the adhesive begins to foam. As the adhesive foams, void spaces between the wheel and cover are filled with the foamed adhesive.

Turbine or brake vent openings are a necessary element in today's wheel systems in providing proper cooling to brake systems. In addition the aesthetics of endless configurations of turbine or brake vent openings add individuality and style to a vehicle wheels. The inclusion of turbine or brake vent openings in wheels and wheel covers creates problems with the use of adhesives. In order to use foamable adhesives, it may be necessary to use some additional structure to seal large openings such as turbine or brake vent openings to prevent the foamable adhesive from escaping through the opening rather than spread evenly or completely between a wheel and wheel cover.

U.S. Pat. No. 6,007,158 to Maloney et al. discloses a vehicle cover retention system and method for producing the same. Maloney et al. applies an adhesive in a pattern, which when pressed between the wheel cover and wheel can fill less that the entire gap between the wheel cover and wheel, but nevertheless is effective to prevent water, mud and debris from entering into any voids or gaps between the wheel cover and wheel.

U.S. Pat. No. 6,106,075 to Suenaga discloses a wheel assembly that includes at least one pocket for altering a resonance frequency of vibrations of the wheel body. A vibration dampening material such as water, other liquids, silicone, natural or synthetic rubbers, urethane foams or other foams, etc. is provided in the pocket(s).

U.S. Pat. No. 5,630,654 to Chase discloses the use of spacing elements 24 that are made from a heat-resistant structural foam material and provided in voids defined between axially spaced apart portions of a wheel cover and an underlying wheel. The spacing elements serve to prevent the entrapment of water and dirt between the wheel cover and underlying wheel which would otherwise promote corrosion and cause balancing problems for the wheel assembly.

U.S. Pat. No. 5,820,225 to Ferriss et al. discloses a vehicle wheel assembly that includes a wheel cover or appliqué that is adhered to an insert member, which insert member is adhered and/or locked to an underlying steel wheel. The insert member (50) of Ferriss et al. is a full sized element that is stated to be molded to change the depth and contour of the wheel face from the original steel wheel.

The present invention provides inserts for wheel assemblies that are located between decorative wheel covers and underlying wheels which inserts prevent damage to the decorative wheel cover and avoid the wheel assembly from seeming hollow.

DISCLOSURE OF THE INVENTION

According to various features, characteristics and embodiments of the present invention which will become apparent as the description thereof proceeds, the present invention provides a wheel assembly that includes:

a wheel having an outboard surface with a first contour; and a wheel cover having an inboard side with a second contour, the inboard side of the wheel cover being attached to the outboard side of the wheel and the first contour of the wheel being different from the second contour of the wheel cover so that gaps are provided between the wheel cover and the wheel; and inserts provided in the gaps between the wheel cover and wheel, which inserts comprise rigid elements that reinforce the wheel cover and are suitable strong to prevent impact damage to the wheel covers.

The present invention further provides a method of reinforcing a wheel cover of a wheel assembly which includes a wheel cover that is attached to an outboard surface of a wheel with at least one of the wheel cover or wheel being configured so as to provide at least one gap between the wheel cover and the wheel, the method involving:

providing an insert that is configured to fit into the at least one gap so that a top surface of the insert is positioned against the wheel cover and a bottom portion of the insert contacts the outboard surface of the wheel;

positioning the insert on the outboard surface of the wheel; and attaching the wheel cover to the outboard surface of the wheel.

The present invention further provides a method of making a wheel assembly which involves:

providing a wheel having an outboard surface;

providing a wheel cover that has an inboard surface, the outboard surface of the wheel and inboard surface of the wheel cover being configured so as to provide at least one gap between the wheel cover and the wheel when the wheel cover is superposed onto the wheel;

providing an insert that is configured to fit into the at least one gap so that a top surface of the insert will be positioned against the wheel cover and a bottom portion of the insert contacts the outboard surface of the wheel when the wheel cover is supposed onto the wheel;

positioning the insert on the outboard surface of the wheel where the at least one gap will be formed; and attaching the wheel cover to the outboard surface of the wheel so that the insert is within the at least one gap.

BRIEF DESCRIPTION OF DRAWINGS

The present invention will be described with reference to the attached drawings which are given as non-limiting examples only, in which:

FIG. 1 is a perspective view of a wheel assembly according to one embodiment of the present invention.

FIG. 2 is an exploded perspective view of the wheel assembly of FIG. 1.

FIG. 3 is a planar view of a wheel assembly that includes inserts according to one embodiment of the present invention.

FIG. 4 is a cross-sectional view of the wheel assembly of FIG. 3 taken along sectional line IV—IV.

FIG. 5 is a cross-sectional view of the wheel assembly of FIG. 3 taken along sectional V—V.

FIG. 6 is a planar view of a wheel assembly that includes an integral insert according to one embodiment of the present invention.

FIG. 7 is a cross-sectional view of the wheel assembly of FIG. 6 taken along sectional line VII—VII.

BEST MODE FOR CARRYING OUT THE INVENTION

The present invention is directed to wheel assemblies which include decorative wheel covers that are attached to underlying wheels. In particular the present invention is directed to wheel cover assemblies that include insert elements that are position between an outboard surface of a wheel and an inboard surface of a decorative wheel cover, in gaps or spaces provided between the wheel and decorative wheel cover.

The outboard surfaces of wheels are generally functional and not decorative. Often in a wheel assembly the decorative surface contour of a wheel cover may be quite different from the outboard surface contour of an underlying wheel. In such circumstances, gaps or spaces between the wheel cover and underlying wheel can leave the overlying portion of a wheel cover unprotected from impact damage, such as denting in the case of metal wheel covers and cracking or breaking in the case of plastic wheel covers. The inserts of the present invention are configured to be positioned in gaps or spaces between wheel covers and the outboard surfaces of wheels and are configured to prevent impact damage to the wheel covers. In addition, the inserts of the present invention prevent the wheel assembly from seeming, e.g. feeling or sounding, hollow.

The inserts of the present invention are made from materials such as plastics that are rigid and strong so as to provide the desired reinforcement to an overlying wheel cover. The inserts are typically configured to be positioned and supported in predetermined locations on the outboard surface of a wheel and to have top surfaces that are complementarily to the contour of the overlying wheel cover so as to fully reinforce the wheel cover against impact damage. In order to properly position the inserts, the outboard surface of the wheel can be provided with complimentarily shaped recesses into which the inserts can be received. The inserts may be attached by a suitable adhesive to one of the outboard surface of the wheels or to the inboard surface of the wheel covers. Alternatively, when the wheel covers are attached to underlying wheels by mechanical fasteners or mechanical locking systems or means, the inserts can be held in place by a combination of contours between the wheel covers and wheels and by being "sandwiched" between the wheel covers and wheels.

Depending on the decorative design of a given wheel cover more than one shape of insert can be used. In addition, a plurality of individual inserts can be used in a wheel assembly or a unitary insert element can be used which comprises a plurality of insert elements that are connected to a common structural element such as an annular ring.

FIG. 1 is a perspective view of a wheel assembly according to one embodiment of the present invention. The wheel assembly which is generally identified by reference numeral 1 includes a wheel 2 that can be made of aluminum, magnesium, steel, or other material conventionally used for manufacturing vehicle wheels. A decorative wheel cover 3 is bonded or mechanical fastened to the otherwise outer exposed surface 4 (See FIG. 2) of wheel 2. The wheel cover 3 is a thin metallic panel that can be made from stainless steel or other suitable metal or alloy. Alternatively, the wheel cover can be made from a plastic material. The outboard surface of the wheel cover 3 is plated or otherwise finished to provide a decorative finish for the wheel assembly. Conventional plating materials can be used such as an undercoating of nickel and a surface or finish coating of chrome.

Wheel 2 is of the type which includes a small central opening 5 in the wheel hub 6 and a plurality of exposed lug nut apertures 7 arranged in a circular pattern and spaced for the particular vehicle on which wheel assembly 1 is to be employed. Opening 5 will typically be enclosed by a relatively small cap while the lug nuts themselves (not shown) are exposed once the wheel assembly 1 is mounted to a vehicle.

Wheel cover 3 has a geometry and contour which does not necessarily conform to that of wheel 2. However, the outer peripheral edge 8 of the wheel cover 3 matingly fits within rim 9 of wheel 2. Spokes 11 extend radially outwardly from the center hub opening 5 which correspond in size, shape and location to the spokes 10 on wheel 2. Between the spokes 11 of wheel cover 3 are decorative openings or windows 12 that are shaped to conform to corresponding decorative openings or windows 13 in wheel 2. The central hub area surrounding central opening 14 of wheel cover 3 also includes a plurality of lug nut receiving openings 15 which align with and are received within openings 7 in wheel 2 when the wheel cover 3 is position on the wheel 2. The central opening 14 of the wheel cover 3 is aligned with opening 5 in wheel hub 6, as best seen in FIG. 1. When the wheel cover 3 is bonded or mechanically fastened to wheel 2, the wheel cover 3 appears as an integral outer surface of the wheel 1, as depicted in FIG. 1.

Between the wheel cover 3 and outboard surface 4 of the wheel 2 there are gaps where axial contoured portions of the wheel cover 3 are dimensionally greater than the underlying axial contoured portions of the outboard surface 4 of the wheel 2. As discussed below, in such gaps, the inserts of the present invention are provided.

The wheel cover 3 is bonded to wheel 2 by an adhesive that securely bonds the wheel cover 3 to the outboard face of the wheel 2. The adhesive can be applied in any desired pattern or as a continuous layer to the outboard surface 4 of the wheel 2 and/or to the inboard surface of the wheel cover 3. Alternatively, or in addition, to the use of an adhesive, various known mechanical engaging structures can be used to secure the wheel covers 3 to the wheels 2, including spring biased structures, clips, fasteners, etc.

Although the present invention was developed to advance the fabrication and design of metal wheel covers, it has also been determined during the course of the present invention that wheel covers made of solid panels of high-impact plastic materials can be protected against impact damage using the inserts of the present invention. Moreover, the inserts of the present invention can be used in conjunction with plastic wheel covers to avoid the wheel assembly from seeming hollow. An advantage of using a high-impact plastic material such as a combination of polycarbonate and ABS having is that wheel covers 3 made from such materials can be injection molded. However, in certain applications and configurations, plastic wheel covers do not always feel and sound as solid as metal wheel covers. Moreover, there is an unjustified perception that plastic wheel covers are less durable and inferior to metal wheel covers.

FIG. 3 is a planar view of a wheel assembly that includes inserts according to one embodiment of the present invention. The outboard side of the wheel assembly is shown in a planar view in FIG. 3. The wheel assembly has a wheel cover 3 attached to an underlying wheel 2. The center of the wheel cover 3 includes a central opening 14 that will be covered be a cover 16 (See FIG. 4). The wheel cover 3 includes a plurality of raised spokes 11 which extend radially from central opening 14 to the outer periphery of the wheel cover 3. The spokes 11 are evenly spaced apart. Brake vent openings or windows 12 are provided between the spokes 11 as shown. The brake vent openings or windows 12 are recessed and have inclined peripheral walls 17. In FIG. 3 the openings 15 for mounting the wheel assembly on wheel lugs are shown within central opening 12. In this embodiment, the lug nuts that secure the wheel assembly onto a vehicle will be covered by cover 16 (See FIG. 4). Also shown in FIG. 3 is an opening 18 though which a valve stem for a tire mounted on the wheel assembly can extend. Not shown in FIG. 3 are inserts 20 (See FIGS. 4 and 5) which are positioned beneath the raised spokes 11 formed in wheel cover 3.

FIG. 4 is a cross-sectional view of the wheel assembly of FIG. 3 taken along sectional line IV—IV. In FIG. 4 inserts 20 are shown to be positioned between wheel cover 3 and wheel 2 so as to reinforce the wheel cover 3 along the raised spokes 11. The inserts 20 are positioned in recesses 19 formed in the outboard surface of wheel 2. These recesses 19 together with the contour of the raised spokes 11 formed in the wheel cover 3 define a hollow spaces or cavities 21 in which the inserts 20 are located.

As shown in FIG. 4 (and FIG. 5) the inserts 20 have outboard surfaces which are contoured to be complimentary to the contour of the overlying portion of the wheel cover 3. Generally the outboard surface of the inserts 20 is complimentary to and in intermediate contact with the overlying portion of the wheel cover 3 in order to provide structural support to the wheel cover 3. Such structural support provided by the inserts 20 will ideally prevent the overlying portions of the wheel cover 3 from becoming damage by impact. For example, if an object strikes one of the spokes 11 of the wheel assembly shown in FIGS. 3–5, an underlying insert 20 would prevent a metallic wheel cover from being dented and would prevent a plastic wheel cover from cracking or breaking. In addition, by structurally supporting the overlying portions of the wheel cover 3, the inserts 20 will prevent the wheel assembly from have a hollow sound or feel when someone taps or strikes the raised spokes 11 (which would otherwise be hollow absent the inserts).

Whereas the outboard or top surface of the inserts 20 preferably matches the contour of the overlying portions of the wheel cover 3, the inboard or bottom side of the inserts 20 can be configured with a series of reinforcing ribs 22 as shown in FIGS. 4 and 5. The reinforcing ribs 22 allow for a reduction in the weight of the inserts 20, without sacrificing strength. In addition, the reinforcing ribs 22 can be configured to register the inserts 20 in place on the outboard surface of a wheel 2 during attachment of a wheel cover 3 and assembly of a wheel assembly. In this regard, as noted above, the inserts 20 are receive in recesses 19 formed in the outboard surface of the wheel 2. It is possible to configure at least a portion of recesses 19 so that inserts 20 are registered in position therein by one of more of the reinforcing ribs 22. Note for example in FIG. 4, the radial innermost reinforcing rib 22 of each insert 20 is registered in a valley contoured in the recesses 19 formed in the outboard surface of the wheel 2. Similar registration contours and corresponding rib configurations could be provided to register the inserts in radial alignment or any desired alignment.

Cover 16 for the central opening 14 in wheel cover 2 is shown in FIG. 4. Cover 16 is of a conventional design and includes mechanical means 23 for coupling the cover 16 to a lug nut (not shown) in a conventional manner. As shown, the wheel cover 3 extends from within central opening 14 to the peripheral edge of the wheel assembly. In the embodiment depicted in FIG. 4, the outer peripheral edge of the wheel cover 3 extends over the outer rim 9 of the underlying wheel. In other embodiments, the outer peripheral edge of the wheel cover 3 may extend only to the rim 9 of wheel 2.

FIG. 5 is a cross-sectional view of the wheel assembly of FIG. 3 taken along sectional V—V. FIG. 5 taken with FIG. 4 fully shows the configuration of the inserts 20 and the configuration of reinforcing ribs 22 thereof.

The embodiment of the wheel assembly shown in FIGS. 3–5 includes a plurality of individual radially aligned inserts 20. In an alternative embodiment, the inserts could be connected to an annular ring at their radial inner (or outer) ends so as to form a single, unitary or integral element that would be position as a single insert element during assembly of a wheel assembly. Such an embodiment would require that a corresponding annular recess be provided in the outboard surface of the wheel 2 to receive the insert. However, unless the annular ring specifically functions to reinforce an overlying portion of the wheel cover, the annular ring would not have to be very thick and a recess to receive the annular ring would not have to be very deep.

FIG. 6 is a planar view of a wheel assembly that includes an integral or unitary insert according to one embodiment of the present invention. The insert in FIG. 6 includes an annular ring 24 from which a plurality of insert elements 20' extend outward radially. FIG. 7 is a cross-sectional view of the wheel assembly of FIG. 6 taken along sectional line VII—VII. As indicated in FIG. 7 the annular ring 24 of the integral insert can be relatively thin since it is not intended to reinforce the over lying wheel cover, but only connect the plurality of insert elements 20' together so that the integral or unitary insert can be positioned easily on the outboard surface of a wheel during assembly according to the present invention.

In further embodiments, inserts according to the present invention could have any shape and any number of inserts could be used as desired for any particular wheel cover design or configuration, provided that any necessary recesses are provided in the outboard surface of the underlying wheel. In addition to, or as an alternative to, providing ribs on the bottoms of the inserts, the inserts could have peripheral walls of a height and contour which provides the necessary positioning of the inserts between a wheel and wheel cover. In some cases the ribs could extend in a single direction rather than bi-directionally as shown in FIGS. 3–5, or legs or posts or any suitable supporting/positioning structure could be provided on the inserts.

The inserts of the present invention can be made from any temperature resistance plastic material that is suitable rigid and strong to provide the desired reinforcement to a wheel cover. Alternatively, the inserts could be made from metals or metal alloy materials. However, lighter materials such as plastics or resins are generally preferred in order to reduce overall weight and limit forces acting on the inserts during movement of a wheel assembly. Exemplarily materials from which the inserts can be made include polycarbonate-ABS alloys, acetal copolymers such as Delrin® (available from E. I. DuPont Co., Wilmington, Del.), heat-resistant stiff plastic materials reinforced with glass or mineral fibers. Since the inserts are not visible, it is also possible to make them out or recycled, e.g. regrind, materials. It is also possible to make the inserts from or use them in conjunction with materials that dampen vibration/sound.

The wheel assemblies which include the inserts of the present invention are assembled by supporting the wheels with their outboard surface facing upward. Next, the inserts are positioned in place on the outboard surface of the wheels. A temperature resistant adhesive is applied either to the inboard surface of the wheel covers and/or to the exposed outboard surface of the wheel and top surfaces of the inserts and the wheel covers are pressed against the wheels and inserts. In this manner of assembly, the inserts are attached only to the wheel covers. Accordingly, for such an assembly it can be understood that the top surface of the inserts need to be complementary to the corresponding inboard surface areas of the wheel covers. Attaching the inserts only to the inboard surface of the wheel covers, rather than to both the outboard surface of the wheels and the inboard surface of the wheel covers eliminates concerns that thermal expansion differences between the wheels and wheel covers will disrupt the attachment of the inserts.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A wheel assembly that comprises:
   a wheel having an outboard surface with a first contour and a plurality of brake vent openings formed therein; and
   a wheel cover containing a plurality of windows which are aligned with the openings formed in the wheel, said wheel cover further having an inboard side with a second contour, the inboard side of the wheel cover being attached to the outboard side of the wheel and the first contour of the wheel being different from the second contour of the wheel cover so that gaps are provided between the wheel cover and the wheel; and
   inserts provided in the gaps between the wheel cover and wheel, which inserts comprise rigid elements that reinforce the wheel cover and are suitable strong to prevent impact damage to the wheel covers,
   said inserts being separate elements from the wheel cover and at least partially located between portions of adjacent ones of said windows of the wheel cover exclusive of extending axially into the brake vent openings formed in the wheel.

2. A wheel assembly according to claim 1, wherein the inserts are made from a plastic material.

3. A wheel assembly according to claim 1, wherein the outboard surface of the wheel is provided with recesses that are configured to receive the inserts therein.

4. A wheel assembly according to claim 3, wherein the inserts and recesses are configured so that the inserts are registered in a desired position when placed in the recesses.

5. A wheel assembly according to claim 1, wherein the wheel cover is configured to have a plurality of raised spokes and the gaps between the wheel cover and wheel are beneath the raised spokes.

6. A wheel assembly according to claim 1, wherein the inserts have top surfaces which are complementary shaped to adjacent portions of the wheel cover and bottom portions that comprise discrete support members.

7. A wheel assembly according to claim 1, wherein the inserts comprise a plurality of insert elements which are connected together to form a unitary structure.

8. A wheel assembly according to claim 7 wherein the plurality of insert members are connected together by an annular shaped element.

9. A wheel assembly according to claim 1, wherein the inserts are attached to the wheel cover.

10. A wheel assembly according to claim 1, wherein the wheel cover is attached to the wheel by an adhesive.

11. A method of reinforcing a wheel cover of a wheel assembly which includes a wheel cover having a plurality of windows formed therein which wheel cover is attached to an outboard surface of a wheel having a plurality of brake vent openings formed there with at least one of the wheel cover or wheel being configured so as to provide at least one gap between the wheel cover and the wheel, said method comprising:
   providing an insert that is configured to fit into the at least one gap so that a top surface of the insert is positioned against the wheel cover and a bottom portion of the insert contacts the outboard surface of the wheel;
   positioning the insert on the outboard surface of the wheel; and
   attaching the wheel cover to the outboard surface of the wheel so that the insert is at least partially located between portions of adjacent ones of said windows of the wheel cover exclusive of extending axially through any of the brake vent openings formed in the wheel.

12. A method of reinforcing a wheel cover of a wheel assembly according to claim 11, wherein the insert is attached to the wheel cover.

13. A method of reinforcing a wheel cover of a wheel assembly according to claim 11, wherein the outboard surface of the wheel is provided with at least one recess that is configured to receive the insert therein.

14. A method of reinforcing a wheel cover of a wheel assembly according to claim 11, wherein the at least one gap comprises a plurality of gaps and the steps of providing an insert and positioning an insert on the outboard surface of the wheel comprise providing and positioning a plurality of inserts.

15. A method of reinforcing a wheel cover of a wheel assembly according to claim 11, wherein an adhesive is used to attach the wheel cover to the outboard surface of the wheel and an adhesive is used to attach the insert to one of the outboard surface of the wheel and the wheel cover.

16. A method of reinforcing a wheel cover of a wheel assembly according to claim 11, wherein the at least one gap comprises a plurality of gaps and the insert comprises a plurality of insert elements that are connected together to form a unitary structure.

17. A method of making a wheel assembly which comprises:
  providing a wheel having an outboard surface and a plurality of brake vent openings formed therein;
  providing a wheel cover that has an inboard surface and a plurality of windows, said outboard surface of the wheel and inboard surface of the wheel cover being configured so as to provide at least one gap between the wheel cover and the wheel when the wheel cover is superposed onto the wheel;
  providing an insert that is configured to fit into the at least one gap so that a top surface of the insert will be positioned against the wheel cover and a bottom portion of the insert contacts the outboard surface of the wheel when the wheel cover is supposed onto the wheel;
  positioning the insert on the outboard surface of the wheel where the at least one gap will be formed; and
  attaching the wheel cover to the outboard surface of the wheel so that the insert is within the at least one gap so that the insert is at least partially located between portions of adjacent ones of said windows of the wheel cover exclusive of extending axially through any of the brake vents openings formed in the wheel.

18. A method of making a wheel assembly according to claim 17, wherein the at least one gap comprises a plurality of gaps and the steps of providing an insert and positioning an insert on the outboard surface of the wheel comprise providing and positioning a plurality of inserts.

19. A method of making a wheel assembly according to claim 17, wherein the outboard surface of the wheel is provided with at least one recess that is configured to receive the insert therein.

20. A method of making a wheel assembly according to claim 17, wherein the insert is attached to the wheel cover.

* * * * *